US012250495B1

(12) United States Patent
Ashworth et al.

(10) Patent No.: US 12,250,495 B1
(45) Date of Patent: Mar. 11, 2025

(54) STREET LIGHT CONTROLLER AND VIDEO SURVEILLANCE SYSTEM

(71) Applicant: Special Services Group, LLC, Denair, CA (US)

(72) Inventors: Andrew J. Ashworth, Vancouver, WA (US); Elizabeth A. Goblirsch, Moss Landing, CA (US)

(73) Assignee: Special Services Group, LLC, Denair, CA (US)

( * ) Notice: Subject to any disclaimer, the term of this patent is extended or adjusted under 35 U.S.C. 154(b) by 246 days.

(21) Appl. No.: 18/155,847

(22) Filed: Jan. 18, 2023

Related U.S. Application Data

(60) Provisional application No. 63/266,950, filed on Jan. 20, 2022.

(51) Int. Cl.
| | |
|---|---|
| *H04N 7/18* | (2006.01) |
| *H04N 9/79* | (2006.01) |
| *H04N 23/52* | (2023.01) |
| *H04N 23/58* | (2023.01) |
| *H04N 23/661* | (2023.01) |
| *H04N 23/69* | (2023.01) |

(52) U.S. Cl.
CPC .............. *H04N 7/183* (2013.01); *H04N 9/79* (2013.01); *H04N 23/52* (2023.01); *H04N 23/58* (2023.01); *H04N 23/661* (2023.01); *H04N 23/69* (2023.01)

(58) Field of Classification Search
CPC ...... H04N 7/183; H04N 23/661; H04N 23/58; H04N 23/69; H04N 23/52; H04N 9/79

USPC ......................................................... 348/143
See application file for complete search history.

(56) References Cited

U.S. PATENT DOCUMENTS

| | | |
|---|---|---|
| 5,886,738 A | 3/1999 | Hollenbeck et al. |
| 6,160,353 A | 12/2000 | Mancuso |
| 6,948,826 B2 | 9/2005 | Fogerlie |
| 7,500,794 B1 | 3/2009 | Clark |
| 7,723,862 B1 | 5/2010 | Spillman et al. |
| 8,249,444 B2 | 8/2012 | Peterson et al. |
| 8,382,387 B1 | 2/2013 | Sandoval |
| 8,711,216 B2 | 4/2014 | Chien |
| 8,820,961 B2 | 9/2014 | Kim |
| 9,131,557 B2 | 9/2015 | Vadai et al. |
| 9,335,750 B2 | 5/2016 | Lu et al. |
| 9,575,394 B1 | 2/2017 | Wallace |
| 9,593,843 B2 | 3/2017 | McRory |
| 10,536,673 B2 | 1/2020 | Noone |
| 10,544,932 B2 | 1/2020 | Gabriel et al. |
| 11,365,879 B2 | 6/2022 | Leblanc et al. |
| 2008/0191897 A1 | 8/2008 | McCollough |
| 2008/0224849 A1 | 9/2008 | Sirhan |
| 2009/0027498 A1 | 1/2009 | Owen et al. |
| 2009/0237509 A1 | 9/2009 | Saxon |
| 2011/0102587 A1 | 5/2011 | Zittel |

(Continued)

*Primary Examiner* — Allen C Wong
(74) *Attorney, Agent, or Firm* — McHale & Slavin, P.A.

(57) ABSTRACT

Disclosed is a street light controller and concealed video surveillance system having an optical zoom lens mounted in a lamp head for securement to a modern street light having a NEMA socket. The video surveillance device is a single, compact unit consisting of a 10× zoom camera with an internal recorder, cellular modem, and a video compressor. The video compressor with a modem and recorder allows for live video from an optical zoom lens, which can be transferred across a cellular network at bitrates down to as low as 10 kbps.

9 Claims, 6 Drawing Sheets

(56) References Cited

U.S. PATENT DOCUMENTS

| | | |
|---|---|---|
| 2011/0141727 A1 | 6/2011 | Kim |
| 2012/0081547 A1 | 4/2012 | Sitzmann et al. |
| 2012/0113646 A1 | 5/2012 | Carmody |
| 2012/0218421 A1 | 8/2012 | Chien |
| 2013/0130522 A1 | 5/2013 | Mitchell et al. |
| 2014/0009632 A1 | 1/2014 | Glover |
| 2014/0313343 A1 | 10/2014 | Frank et al. |
| 2015/0336521 A1* | 11/2015 | Tofilescu ............ B60R 16/023 382/104 |
| 2015/0362172 A1* | 12/2015 | Gabriel ................ F21V 11/16 348/151 |
| 2017/0332149 A1* | 11/2017 | Veeramani ............ G09G 5/005 |
| 2020/0195938 A1* | 6/2020 | Beck ................ H04N 19/184 |
| 2020/0383173 A1* | 12/2020 | Aaron ................ F21V 23/0435 |

* cited by examiner

STREET LIGHT CONTROLLER AND VIDEO SURVEILLANCE SYSTEM

PRIORITY CLAIM

In accordance with 37 C.F.R. 1.76, a claim of priority is included in an Application Data Sheet filed concurrently herewith. Accordingly, the present invention claims priority based upon U.S. Provisional Patent Application No. 63/266,950 filed Jan. 20, 2022 and entitled "STREET LIGHT CONTROLLER AND VIDEO SURVEILLANCE SYSTEM" the contents of which are incorporated herein by reference.

FIELD OF THE INVENTION

This invention is directed to the field of video surveillance systems; and in particular, to a compact video surveillance device concealed in a lamp head for use with modern street lights.

BACKGROUND OF THE INVENTION

Video surveillance systems are known in the industry. A common location to install a video surveillance system is on conventional light poles found along streets, highways and intersections. The light poles are used to position a light at a distance above road level, illuminating the surrounding area after darkness. Modern light poles further employ a light sensor, also commonly referred to as a photo controller or photo sensor, for operation of the light during darkness and low level light conditions. The sensor is based on the photoelectric effect principle of semiconductors, wherein a photoelectric device converts photons to electrons to complete an electrical circuit that powers the light. The sensor provides efficiency in operation so as to draw electricity only when needed, extending the life of the lighting element.

Conventional light pole assemblies utilize a NEMA power socket for receipt of the sensor assembly; the sensor being a replaceable device. Prior art recognizes the use of the NEMA power socket as a convenient way of powering a video surveillance system in combination with a photo sensor. The sensor operates a light based upon ambient lighting conditions, the video surveillance system drawing power from the NEMA socket.

Known video surveillance systems use one or more fixed length camera lens requiring multiple windows. Fixed length camera lenses limit the quality of the image based upon the distance an object or individual is removed from the camera. Still other known devices lack a video compressor or recorder onboard, making them inefficient for law enforcement surveillance operations.

What is lacking in the art is a combined light sensor and video surveillance device that allows live video transfer without complex devices tethered to the device, wherein an optical zoom lens can be remotely controlled to provide optimum clarity.

SUMMARY OF THE INVENTION

Disclosed is a compact video surveillance system consisting of a pan, tilt and zoom camera with internal recorder, cellular modem and video compressor designed covertly as a common electronic photo controller for use on modern street lights having a NEMA socket. The device has one window and an extremely small form factor that allows for surreptitious law enforcement deployments on streetlights where photo controllers are normally located. The device offers full pan, tilt and zoom capability for viewing, an internal video compressor for bandwidth management, WiFi, and a cellular modem which allows live video to be transferred across the cellular network at bit rates down to as low as 10 kbps. An internal recorder is also included for edge video storage, and with the compressed video feed, the recording time per MB is drastically increased, allowing for significantly longer recordings. In addition, the device takes its power from the streetlight socket and replaces the functionality of the original photo controller, turning the street light off and on based on the ambient lighting conditions.

Still another objective of the invention is to provide a compact video surveillance device having a camera zoom capability of 10×.

Yet still another objective of the invention is to provide a compact surveillance device having an internal SD card recorder to allow for video storage.

Another objective of the invention is to provide streaming video that can be viewed live through a decompression server on video walls, PC's, and handheld mobile devices.

Yet still another objective of the invention is to provide a compact video surveillance device having a video compressor formed integral to the camera to provide an adjustable, low bandwidth, high-quality video feed over cellular networks.

Still another objective of the invention is to employ the exhaust air from a heat sink to remove condensation from the lens assembly during operation in cold weather.

Other objectives and further advantages and benefits associated with this invention will be apparent to those skilled in the art from the description, examples and claims which follow.

DESCRIPTION OF THE PREFERRED EMBODIMENT

Figure 1:
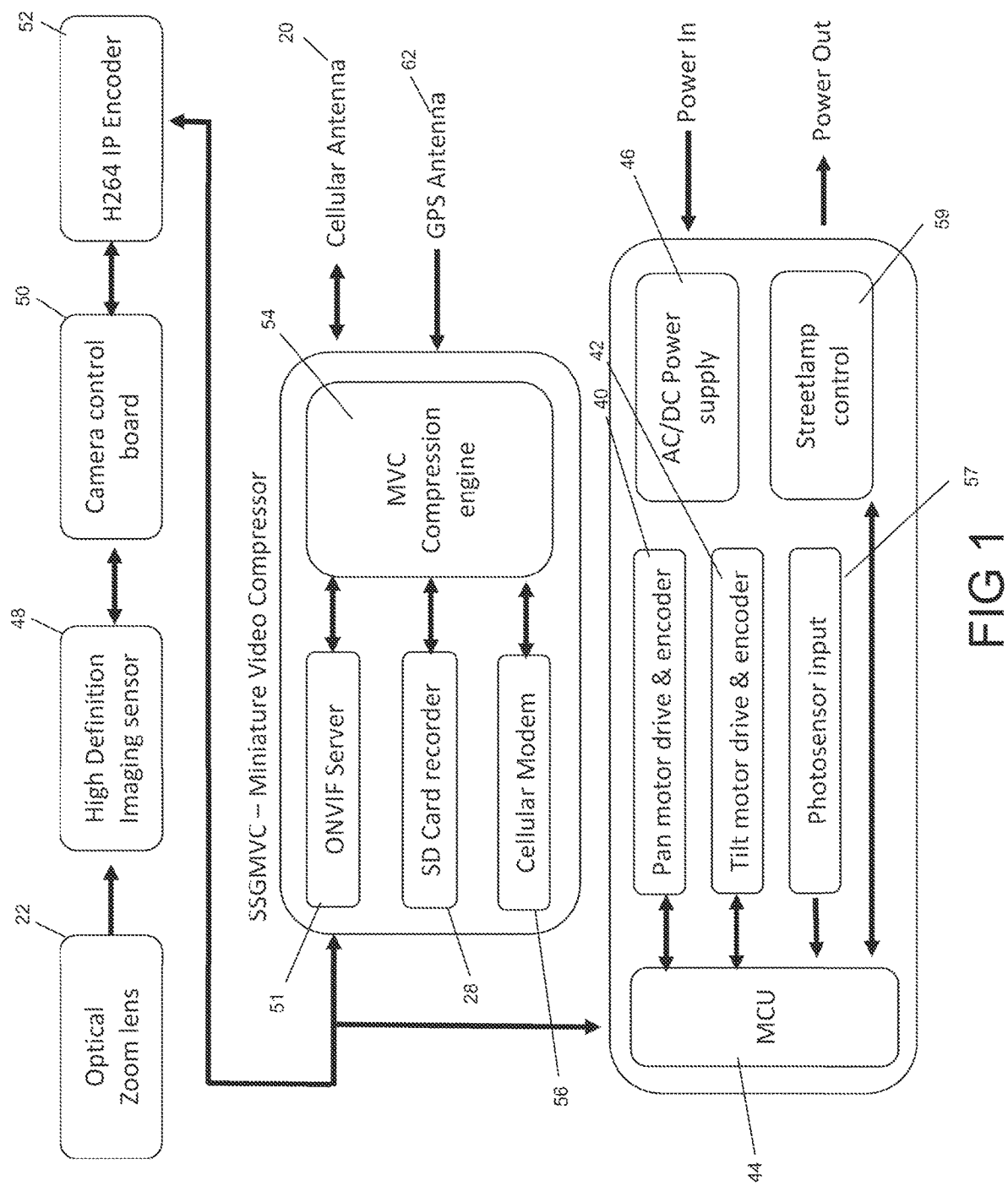
FIG. 1 is a block diagram listing the components of the street light controller and video surveillance system of the instant invention.
Figure 2:
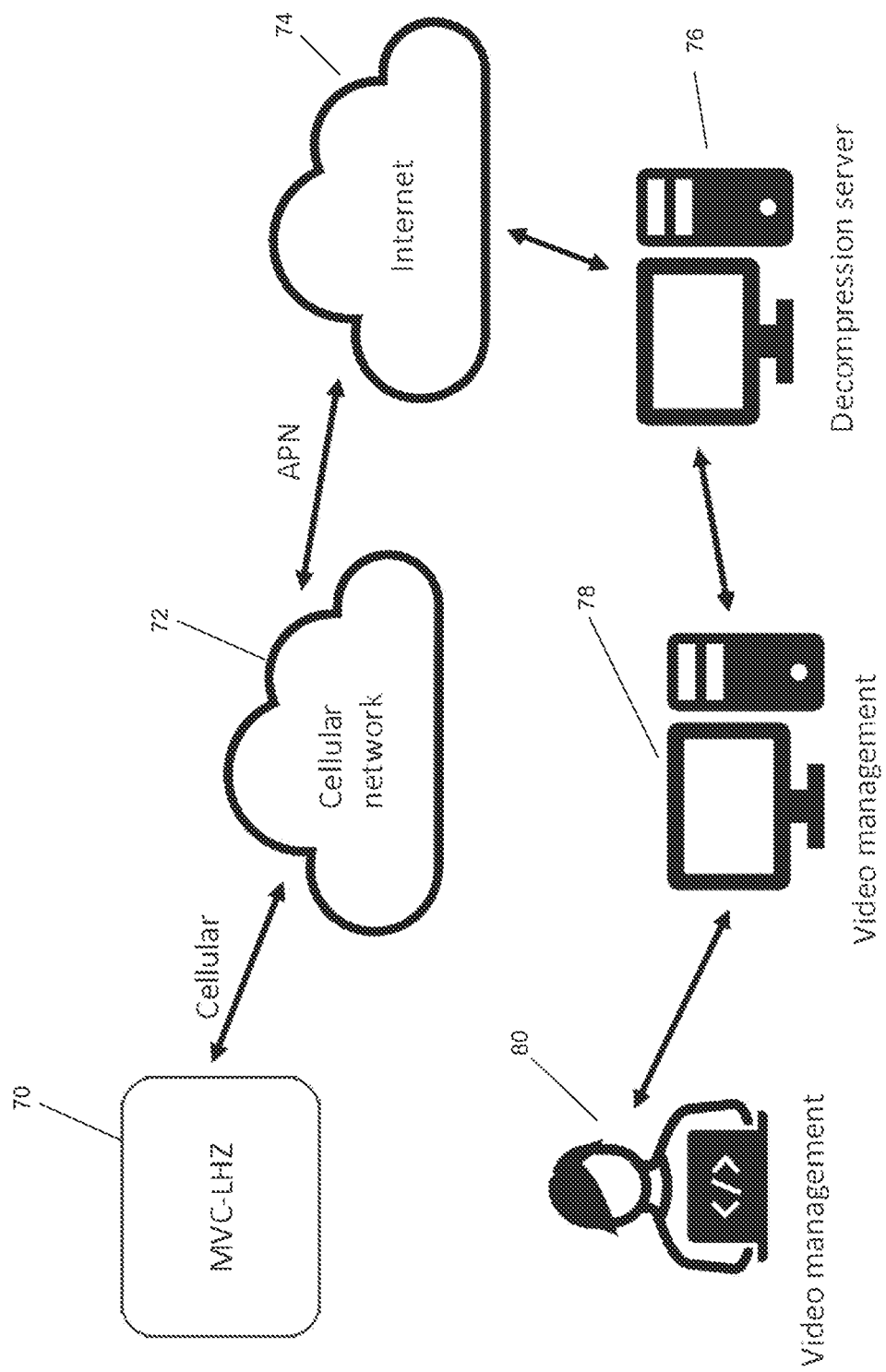
FIG. 2 is a flow diagram illustrating the interconnectivity of the instant invention through cellular connections to a management station.
Figure 3:
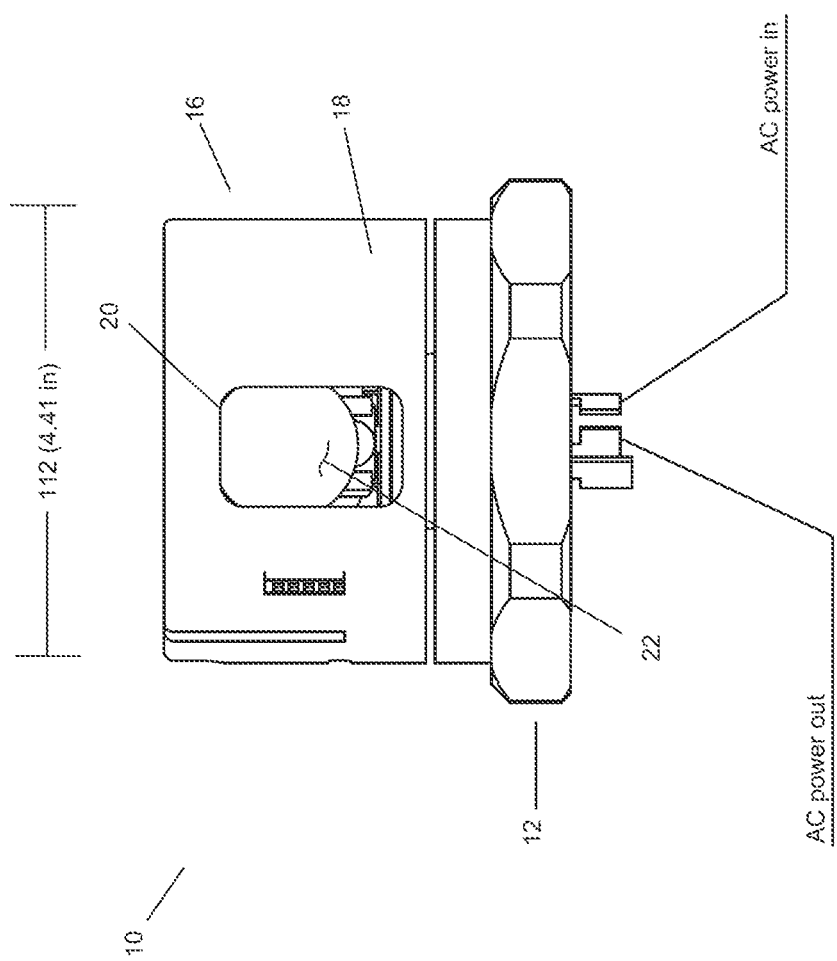
FIG. 3 is a front view of the street light controller and video surveillance device.
Figure 4:
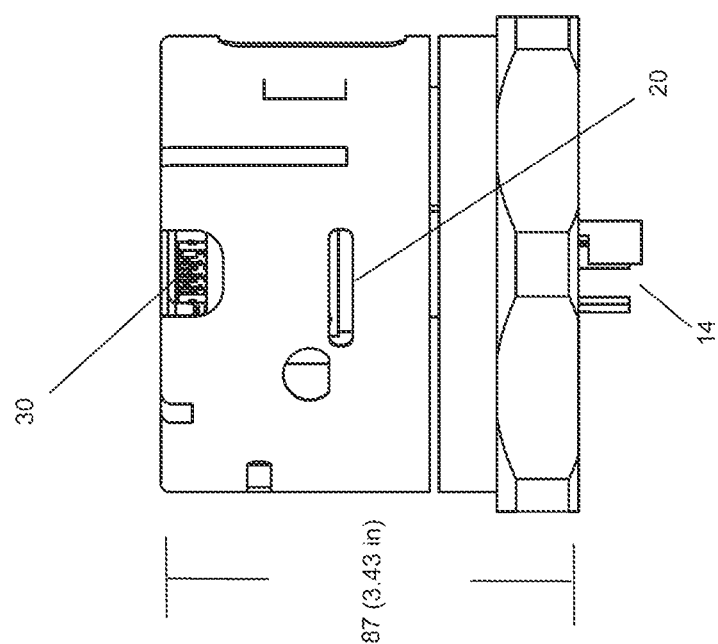
FIG. 4 is a rear view thereof.
Figure 5:
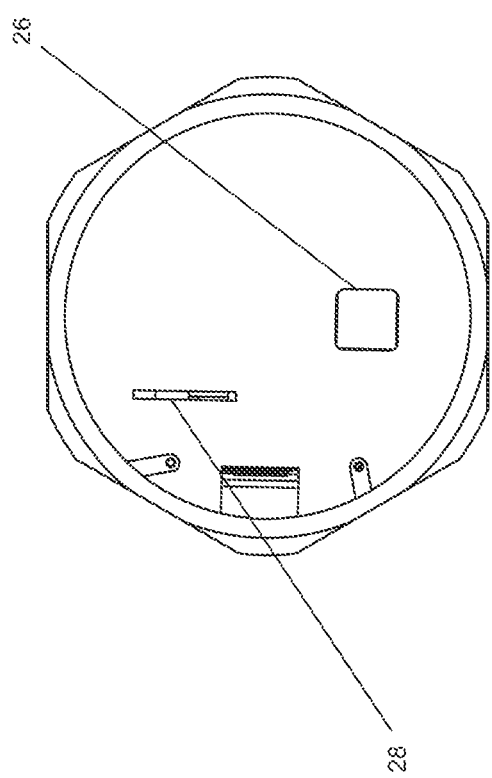
FIG. 5 is a top view thereof.

An embodiment of the instant invention is disclosed herein, however, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the art to variously employ the present invention in virtually any appropriately detailed structure.

Referring to the Figures, in a preferred embodiment a street light controller and video surveillance system includes a camera consisting of a 10× optical zoom lens 22 coupled to a high definition imaging sensor 48 and control board 50. The camera produces a non-standard video output in the form of low voltage differential signaling (LVDS). The H264 IP encoder 52 takes this signal, and encodes it to industry standard, H264 video compression, presenting its output as H264 over RTSP. This RTSP stream is ingested by a miniature video compressor 54 having an ONVIF server coupling 51; the control board having a shape and dimensions being constructed and arranged to fit within a rotatable enclosure 18. The RTSP stream is compressed by the controller to a rate low enough to be passed economically over cellular connections via an internal modem. In addition to the compression function, the surveillance system provides internal video recording (up to 1 TB) using an SD card recorder 28, and hosts a GPS receiver with an antenna 62. Within the enclosure 18 is a video compressor which is connected to an internal LTE modem 56 which provides an egress path for the video offering either reduced bitrate, or improved video quality over H264 and H265 encoding solutions. The video surveillance system offers direct integration into VMS systems by an ONVIF server 51 compatible interface. All settings are available to a user by a decompression server webpage. Bitrate, frame rate and resolution can be varied by the user, allowing the user to effectively manage their cellular plan.

In operation, the compressed video is sent over the cellular network to a decompression server at the customer's location. This server decompresses the video back to H264 and provides it as an ONVIF stream to the user's video management system. One of the functions of a video management system is to provide a control interface for the remote camera. In this case, the pan, tilt and zoom functions of the device are fully controllable. When the user generates a zoom command at the video management system station, the command is transferred back through the chain to the camera. Initially, the command is received by the decompression server; this passes the command to the selected device embodiment, a street light controller and video surveillance system via the cellular link. The system extracts this command from the ONVIF stream and addresses it directly to the processor on the H264 IP encoder. This system then translates the command to RS232 and passes it to the camera control board, which directly actuates the zoom lens. When the user generates a pan or tilt command at the embodiment, a street light controller and video surveillance system video management system station, the command is transferred back through the chain to the device. Initially, the command is received by the decompression server; this passes the command to the selected device via the cellular link. The system extracts this command from the ONVIF stream, converts it to RS232 and passes it to the motion control microcontroller. This integrated circuit drives the required motor in the required direction at the required speed. Speed and position are constantly monitored by encoders, allowing the system to both save and recall preset positions when commanded to do so by the user.

The camera offers 10× zoom capability, the video compressor with modem allows for live video to be transferred across the cellular network at bitrates down to as low as 10 kbps, and the internal recorder allows for long term video storage using an SD card for ease of retrieval.

Referring to FIGS. 3-6, illustrated is the street light controller and video surveillance device 10 having a base 12 with a NEMA plug 14 extending therefrom. A rotatable upper section 16 comprises an enclosure 18 have a single window 20 for concealment of an optical zoom lens 22. In the preferred embodiment, the diameter of the enclosure 18 is about 112 mm and the height including base is about 87 mm. A cellular antenna position 20 is accessible through opening 26. A SIM card 28 is accessible through an access slot 30.

Figure 6:
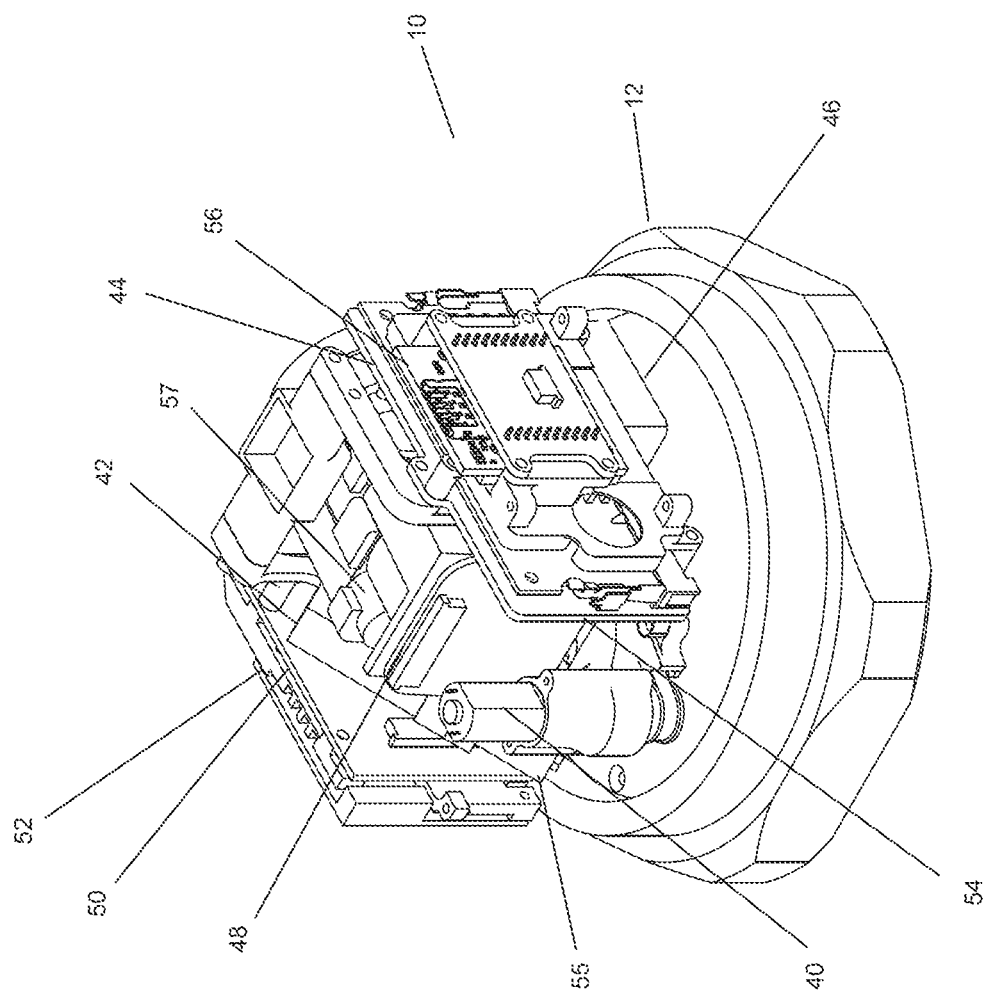
FIG. 6 is a perspective view of the street light controller and video surveillance device with the top enclosure removed.

Referring to FIG. 6, the street light controller and video surveillance device 10 with the enclosure 18 removed illustrates the positioning of the pan motor 40 and tilt motor 42. A motion control microcontroller 44 is electrically coupled to an AC/DC power supply 46. The optical zoom lens 22 is coupled to the high definition imaging sensor 48 and camera control board 50 including an H264 IP Encoder 52. Images are directed through a miniature video compressor 54 employing a cellular modem 56. The cellular modem 56 includes a cellular antenna 20 for communication and a GPS with antenna 62 for location instructions.

The compressed video 70 is sent over the cellular network coupled to the internet 74 to a decompression server 76 at the customer's location. This server decompresses the video back to H264 and provides it as an ONVIF stream to the user's video management system 78 for viewing and control by the user 80.

In addition to the above functions, the motion control microcontroller 44 also reads the ambient light level as measured by a photo sensor 57. This measurement is used as the input of an algorithm to calculate when the power should be turned on to the street lamp to illuminate it. This AC switching is commanded by the motion control microcontroller via a streetlamp control 59 having a solid state relay.

Between the video compressor 54 and the cellular modem 56 is a heat sink 55. The heat sink 55 draws air from outside the enclosure 18 and, using a fan 57, transfers air through the enclosure 18 to dissipate heat from the components. The resulting hot air is vented across the front of the lens 22 to clear any fog or condensation from the lens 22.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed. The term "about" or "generally about" means, in general, the stated value plus or minus 5%.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A video surveillance system for a street light having a NEMA socket coupled to a power source, said video surveillance system comprising:
    an enclosure releasably securable to the NEMA socket;
    a camera positioned within said enclosure and electrically coupled to the power source, said camera forming a low voltage differential signaling (LVDS) video output;
    an encoder for receipt of said video output and encoding the video output to H264 standards to an RTSP stream;
    an SSMVC compressor to compress said RTSP stream into a compressed video;
    a modem for transfer of said compressed video through a cellular connection; and
    a photosensor positioned within said enclosure providing an electrical coupling between the power source and the street light to replace the functionality of a photo controller for automatic lighting;
    wherein compressed video from said camera is sent over a cellular network to a decompression server at a remote location and decompressed back to H264 format as an ONVIF stream to a user's video management system for video surveillance.

2. The video surveillance system according to claim 1 wherein said camera is a high definition imaging sensor.

3. The video surveillance system according to claim 1 including a motion control microcontroller coupled to a motor for panning and a motor for tilting said camera, wherein the system obtains remote control directions which are extracted from the ONVIF stream and converted to RS232 which is passed to the motion control microcontroller for driving a required motor in a required direction at a speed, wherein speed and position are constantly monitored by encoders, allowing the system to both save and recall preset positions when commanded to do so by the user.

4. The video surveillance system according to claim 1 wherein said modem is an LTE modem.

5. The video surveillance system according to claim 1 wherein said camera includes a 10× optical zoom.

6. The video surveillance system according to claim 1 including a GPS receiver and antenna positioned within said enclosure, said GPS receiver providing coordinates as to the location of the video output obtained from said surveillance system.

7. The video surveillance system according to claim 1 wherein said camera includes internal video recording for storage on a SD card.

8. The video surveillance system according to claim 1 wherein said enclosure is rotatable and generally 112 mm in diameter and generally 87 mm in height.

9. The video surveillance system according to claim 1 including a heat sink with a fan positioned adjacent said compressor for directing air through said enclosure to dissipate heat from the components and further direct the heat to dissipate condensation from the lens.

* * * * *